US008544615B2

(12) United States Patent
Martinez

(10) Patent No.: US 8,544,615 B2
(45) Date of Patent: Oct. 1, 2013

(54) METHOD AND DEVICE FOR BRAKE DUST COLLECTION

(76) Inventor: Edward L. Martinez, Santa Cruz, CA (US)

( * ) Notice: Subject to any disclaimer, the term of this patent is extended or adjusted under 35 U.S.C. 154(b) by 424 days.

(21) Appl. No.: 12/661,700

(22) Filed: Mar. 22, 2010

(65) Prior Publication Data

US 2010/0236880 A1  Sep. 23, 2010

Related U.S. Application Data

(60) Provisional application No. 61/210,550, filed on Mar. 20, 2009.

(51) Int. Cl.
*F16D 65/00* (2006.01)
(52) U.S. Cl.
USPC .............. 188/218 A; 188/218 R; 301/37.101; 301/108.1
(58) Field of Classification Search
USPC ...... 188/218 A, 218 R, 218 XL; 301/37.101, 301/37.29, 37.31, 108.1, 108.3
See application file for complete search history.

(56) References Cited

U.S. PATENT DOCUMENTS

| 1,927,816 | A | | 9/1933 | Simmons |
|---|---|---|---|---|
| 1,931,946 | A | | 10/1933 | Zerk |
| 2,952,339 | A | | 9/1960 | Felts et al. |
| 3,332,828 | A | | 7/1967 | Faria et al. |
| 4,005,768 | A | | 2/1977 | Bubnash et al. |
| 4,484,667 | A | * | 11/1984 | Bottieri, Jr. ............... 188/218 A |
| 5,039,172 | A | * | 8/1991 | Krieger ...................... 301/37.11 |
| 5,722,734 | A | | 3/1998 | Bennick |
| 6,371,569 | B1 | * | 4/2002 | Dean ......................... 301/37.101 |
| 6,592,642 | B2 | | 7/2003 | Maricq et al. |
| 7,833,302 | B2 | * | 11/2010 | Krantz .......................... 55/385.3 |
| 2007/0000740 | A1 | | 1/2007 | Raab |

* cited by examiner

*Primary Examiner* — Pamela Rodriguez
(74) *Attorney, Agent, or Firm* — Patrick Reilly; Colin Fawley

(57) ABSTRACT

A method and device for capturing particulates produced by a brake shoe of a motorized vehicle are provided. A strip of material is attached to an inner planar race of a wheel rim and is positioned to capture particulates ("brake dust") caused by the friction braking process. Particulates may be driven toward the strip by centrifugal force, chemical attraction, electrostatic force and/or magnetic force. The strip may be shaped with a plurality of faces to provide a greater surface area than a flat planar strip of material provides. The strip may include cilia, a nappy material, and/or a loop material to attract and retain the brake dust. The strip may be magnetic or include a magnetic substance. An adhesive material is placed upon a second strip surface, whereby the strip is removably coupled to the inner race by the adhesive material.

12 Claims, 12 Drawing Sheets

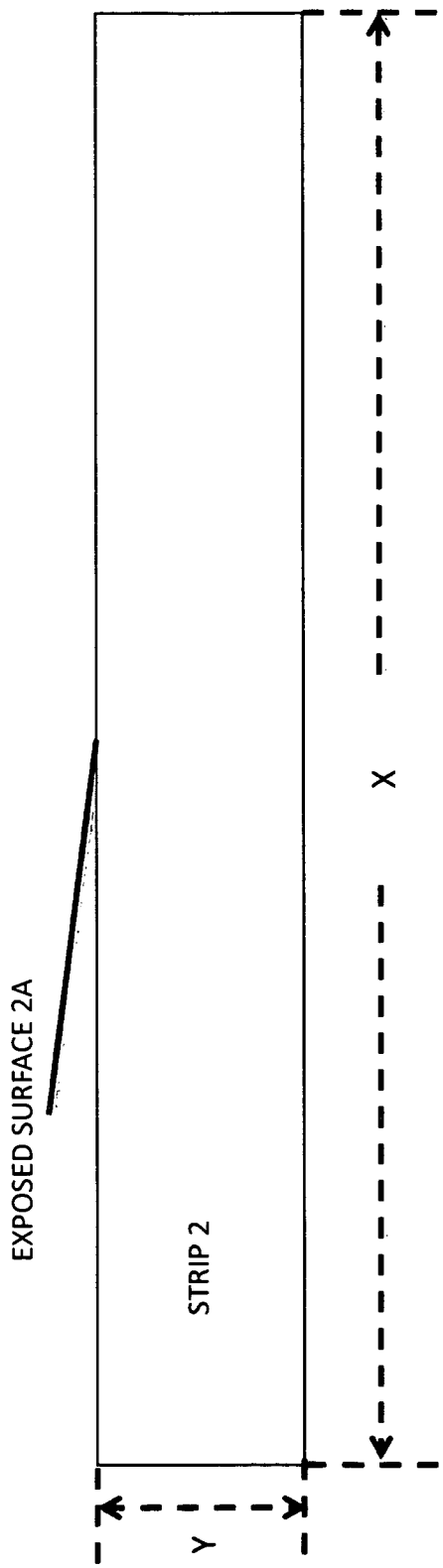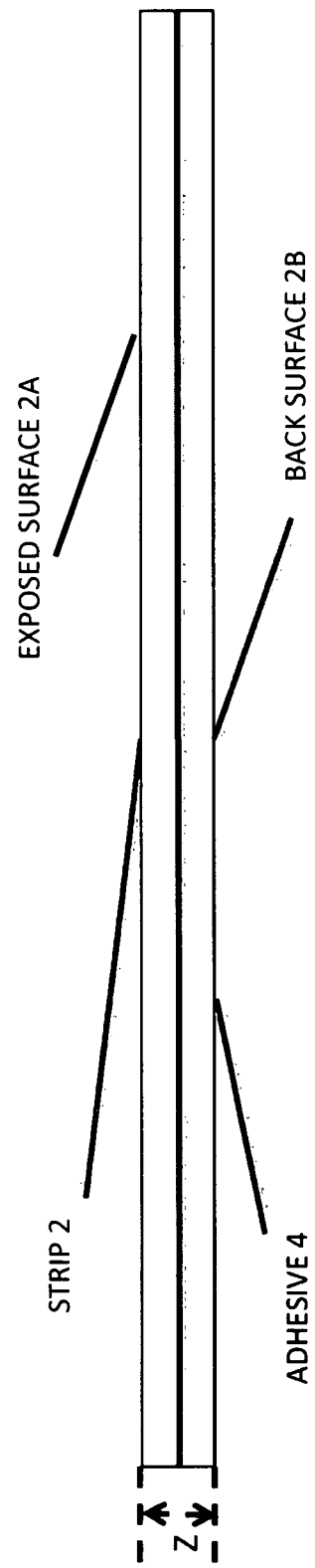

METHOD AND DEVICE FOR BRAKE DUST COLLECTION

CO-PENDING APPLICATIONS

The present Nonprovisional patent application is a Continuation-in-Part of U.S. Provisional Patent Application Ser. No. 61/210,550, titled "Brake Duster Systems", The present Nonprovisional patent application claims the priority date of Provisional Patent Application Ser. No. 61/210,550 and Provisional Patent Application Ser. No. 61/210,550 is hereby incorporated into the present Nonprovisional Patent Application in its entirety and for all purposes.

FIELD OF THE INVENTION

The present invention relates generally to pollution control. The present invention more particularly relates to capturing particulates emitting proximate to a rotating object.

BACKGROUND OF THE INVENTION

Mechanical power systems that drive rotating elements, such as vehicles that include drive trains for rotating wheels also typically include braking elements that press against a rotating element of the drive train or system to halt a rotation. The physical contact of brake pads applied against rotating elements often therefore generates particulates that are released proximate to the forcibly decelerated rotating element.

In one exemplary source of pollution, the wide use of brake pads in hundreds of millions of automobiles creates significant contribution to environmental pollution. Brake systems in many other vehicles, including but not limited to motorized boats and airplanes, also produce particulate outflow within inches of a rotating wheel or rotor.

Most braking systems currently in use by a truck, car, train or other heavy equipment employs a composite surface of one or another material applied under pressure to another surface attached to the wheel, either hydraulically, Mechanically, electrically or pneumatically, employed to slow and stop the vehicle. All of these prior art braking systems eject material into the air and onto other mechanical parts and environments, including wheel surfaces, braking parts and the surface the vehicle is traveling on or through, usually referred to as the air or ground.

There is a long-felt need to provide devices and methods to capture the particulates released near rotating objects in order to reduce the contribution of particulates generated in the forced friction braked deceleration of the rotating object.

The present invention provides a method of trapping or collecting and thereby isolating that ejected material in such a way that it is largely removed from the immediate environment by means of centrifugal force, magnetic, electrostatic or chemical attraction, isolating and permitting the recovery of any toxic or recyclable materials. These are all methods of entrapment in a medium comprised of a thin napped, folded or fiber attached by removable adhesive to the inside race of a rim of a wheel, in close proximity to the braking device, so as not to impede proper cooling of the brake mechanism or the wheel. This as opposed to other brake ejective recovery prior art which is primarily attached to a brake mechanism, wheel assembly or interior of a wheel enclosure.

The present invention provides a method for not only preventing brake dust from contaminating wheel surfaces and mechanisms, but also to prevent a significant portion of this material from entering the environment, which for the purposes of discussion includes the water table, air and ground peripheral to the areas where these brake mechanisms are employed.

The present invention offers the users of the afore mentioned vehicles employing certain prior braking systems an easy to use and completely disposable method of reducing the amount of brake dust their systems deposit on other mechanical systems and the environment in such a way as to be recyclable, readily available and cost effective. Other benefits of the present system can be applied by a service agent authorized to work on these vehicles on a frequent basis because the present invention requires no fasteners or mechanical attachments. Additionally, this system is not reliant on the vehicles electrical system or other mechanical systems to operate, meaning it is fully independent of the vehicles mechanical system, requiring no additional assembly or attachment to the braking unit.

The present invention employs a thin film of material in the form of a napped, fold or fiber material that can be adapted and composed to fit the individual braking systems particular composition and configuration making it readily adaptable to any braking system regardless of composition or construction.

The method of the present invention enables the recovery of toxic and recyclable materials and encourages safe recycling and recovery of unwanted environmental contaminants.

SUMMARY OF THE INVENTION

This and other objects of the present invention are made obvious in light of this disclosure, wherein a method and device for capturing particulates released proximate to a rotating object are captured and the introduction of the particulates into a surrounding environment is reduced or eliminated.

In a first device, a strip of material is attached to an inner planar race of a rim of a wheel of an automobile. The rim supports a tire along an external race and is coupled to a rotatable axle. The automobile further includes a friction braking system and drive train that includes a powered axle that is in turn coupled with the rim. The friction braking system may be applied against the rotating rim and/or axle to cause a forced deceleration of rotation of the tire. The strip is positioned upon the inner planar race of the rim to capture particulates (hereinafter "brake dust") that is caused by the friction braking process. Particulates may be driven toward the strip by centrifugal force, chemical attraction, electrostatic force and/or magnetic force. The brake dust is further captured and retained by the strip by centrifugal force, chemical attraction, electrostatic force and/or magnetic force.

In a second device, the strip is shaped to for a plurality of faces that angle up from the inner race wheel, wherein the angled faces provide greater surface area than a flat planar strip of material provides. In a third device, the strip is shaped with a cilia extend up from the inner race wheel, wherein the cilia provide greater surface area than a flat planar strip of material provides. In a fourth device, the strip comprises a nappy material that captures brake dust. In a fifth device, the strip comprises a looped material that captures brake dust.

The strip may include a magnetic substance, such as magnetized ferrite powder positioned along a first surface of the strip and/or distributed within the strip. The strip may further include an adhesive material placed upon a second strip surface, wherein the strip is removably coupled to the inner race by the adhesive material.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

Such incorporations include US Patent Application Publication No. 20070000740 (inventor Raab, S.; published on Jan. 4, 2007) titled "Brake pad dust collector or diverter"; U.S. Pat. No. 6,592,642 (inventors Maricq, et al.; et al.; issued on Jul. 15, 2003) titled "Brake dust collection assembly"; U.S. Pat. No. 4,005,768 (Bubnash, et al.; issued on Feb. 1, 1977) titled "Dust shield for disc brake"; U.S. Pat. No. 2,952,339 (inventors Felts, et al.; issued on Sep. 13, 1960) "Brake seal"; U.S. Pat. No. 5,722,734 (inventor Bennick, T.; issued on Mar. 3, 1998) "Rim brake dust protecting system"; U.S. Pat. No. 3,332,828 (inventors Faria J. and Wright, R.; issued on Jul. 25, 1967) titled "Monofilament ribbon pile product"; U.S. Pat. No. 1,931,946 (inventor Zerk, O.; issued on Oct. 24, 1933) titled "Brake drum cover"; and U.S. Pat. No. 1,927,816 (inventor Simmons, W.; issued on Sep. 19, 1933) titled "Dust shield for brake drums".

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

BRIEF DESCRIPTION OF THE FIGURES

These, and further features of various aspects of the present invention, may be better understood with reference to the accompanying specification, wherein:

FIG. 1A is a top view of a strip of flexible sheet material;

FIG. 1B is a side view of the strip of FIG. 1A;

DETAILED DESCRIPTION

Figure 2:
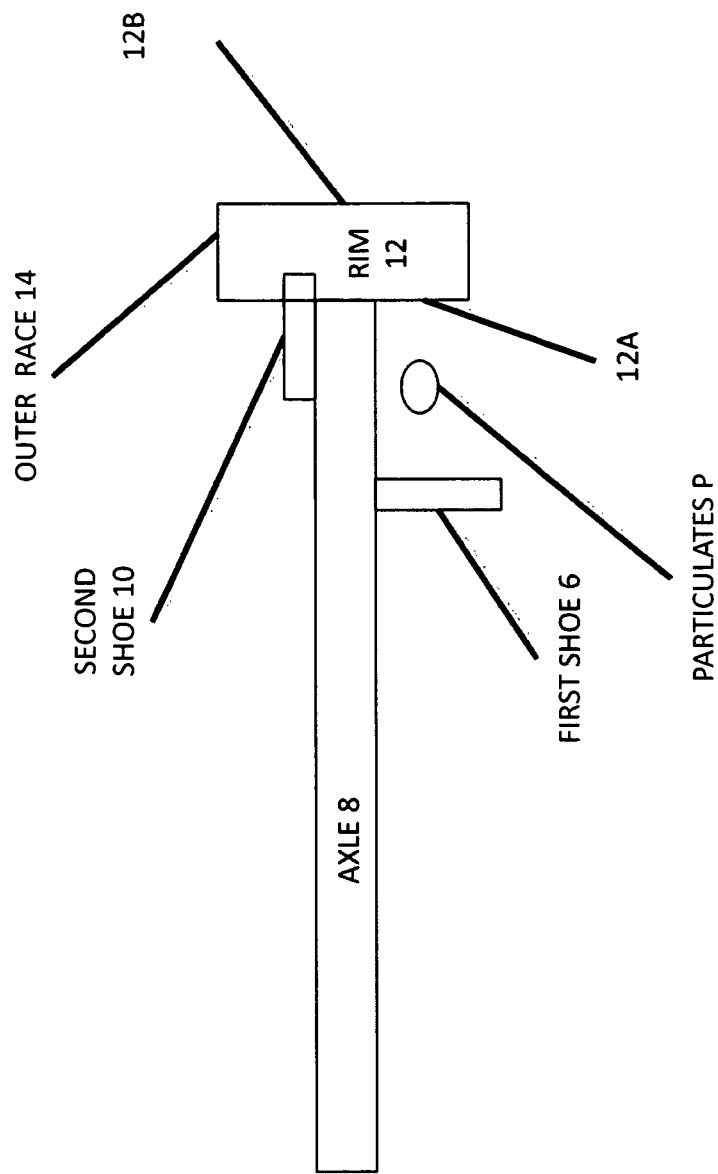
FIG. 2 is a partial schematic diagram of a drive train comprised within an automobile.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims.

Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

Referring now generally to the Figures and particularly to FIG. 1A and FIG. 1B, FIG. 1A is a top view of a strip of flexible sheet material 2 (hereinafter "strip" 2) having an exposed surface 2A length along an X-axis and a width along an orthogonal Y-axis. FIG. 1B is a side view of the strip 2 showing a back surface 2B of the strip 2 layered with an adhesive 4. The strip has a thickness along a Z-axis, wherein the Z-axis normal to the plane formed by the X-axis and Y-axis.

The strip 2 may be or comprise an olefin film or a polyester film, such as an electrostatically charged Mylar film having a thickness along the Z-axis preferably within the range of from one millimeter to three millimeters. Alternatively, the strip may be or comprise other suitable material known in the art.

In various alternate configurations of the strip 2, the strip 2 may alternatively or additionally be or comprise a material having a napped structure comprising voids that can retain particulates P, such as a SCOTCH-BRITE™ plastic material as marketed by 3M Corporation of St. Paul, Minn.

In various other configurations of the strip 2, the strip 2 may alternatively or additionally be or comprise a suitable natural or synthetic material known in the art that includes cilia that can retain particulates P between or among the cilia therein, such as a strip of ASTROTURF™ synthetic ground covering as marketed by Monsanto Corporation of St. Louis, Mo.

The strip 2 has a depth along the Z-axis preferably within the range of from one millimeter to one centimeter. It is understood that certain variations of the strip 2 may be above or below this depth range.

Referring now generally to the Figures and particularly to FIG. 2, FIG. 2 is a partial schematic diagram of a drive train comprised within an automobile (not shown in full). A first brake shoe 6 is applied with friction generating force to stop rotations of an axle 8, and a second brake shoe 10 is applied with friction generating force to stop rotations of the axle 8 and/or a rim 12. It is understood that various vehicles employ two or more brake shoes 6 and 10 to stop a rotation of the axle 8 and/or the rim 12. The operation of forcing one or more brake shoes 6 and 10 generates a plurality of particulates P.

Figure 3:
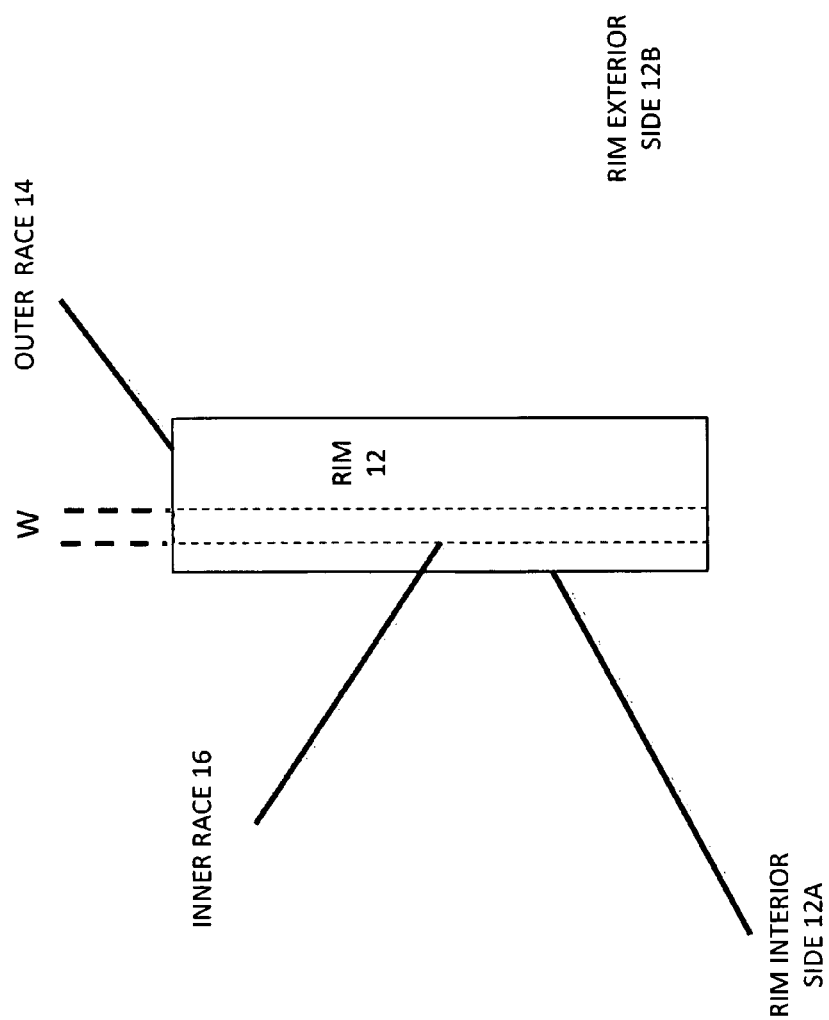
FIG. 3 is a top view of a rim showing an outer race 14 and an inner planar race.
Figure 4:
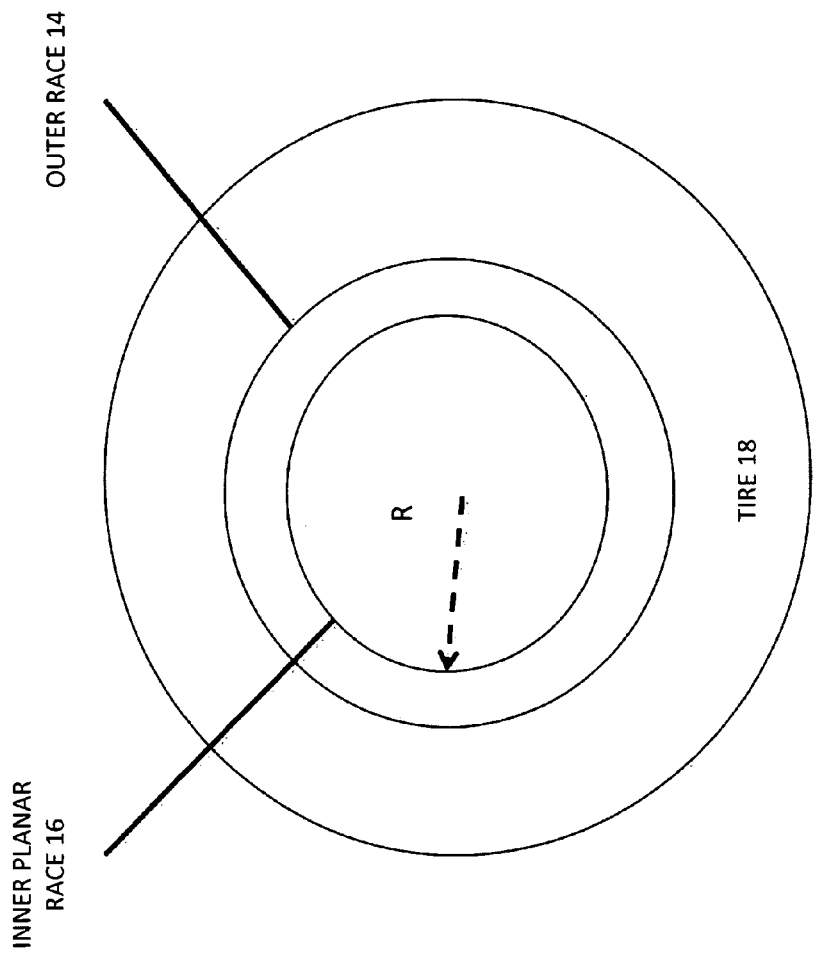
FIG. 4 is a front view of the interior side of the rim of FIG. 3 showing a radius R of the inner planar rim.

Referring now generally to the Figures and particularly to FIG. 3 and FIG. 4, FIG. 3 is a top view of the rim 12 showing an outer race 14 and an inner planar race 16, and FIG. 4 is a front view of the interior side 12A of the rim 12 showing a radius R of the inner planar rim 16. The inner planar race 16 is located proximate to the brake shoes 6 and 10, wherein the inner planar race 16 is preferably located no further from the brake shoes 6 and 10 than the distance R of the inner planar race 16.

The inner planar race 16 has a race width W, and a planar surface area A equal to W times 2R. For example, where the inner planar race radius R is six inches, the planar surface area A will be equal approximately six inches times two times 3.14, or approximately 37.68 square inches.

The flexible strip 2 is sufficiently deformable to enable detachable attachment to the inner planar race 16. Preferably the strip 2 is sized and shaped within the X-axis and Y-axis dimensions to cover at least 50% of a surface area of the inner planar race 16. More preferably, the strip 2 is sized and shaped within the X-axis and Y-axis dimensions to cover at least 90% of a surface area of the inner planar race 16. Even more preferably, the strip is sized and shaped within the X-axis and Y-axis dimensions to cover at least 100% of a surface area of the inner planar race 16.

Particulates P may be driven toward the strip 2 by centrifugal force, chemical attraction, electrostatic force and/or magnetic force.

Referring now generally to the Figures and particularly to FIGS. 5A, 5B, 5C and 5D, FIG. 5D is a cut-away perspective of the outside the tire 18 and exterior side 12B of the rim 12, wherein the strip 2 is shown in an alternate configuration with a plurality of faces 2C, and as adhered to the inner planar race 16. The strip 2 may be or comprise a natural or synthetic material that carries an electrostatic charge that attracts the particles P.

Figure 5C:
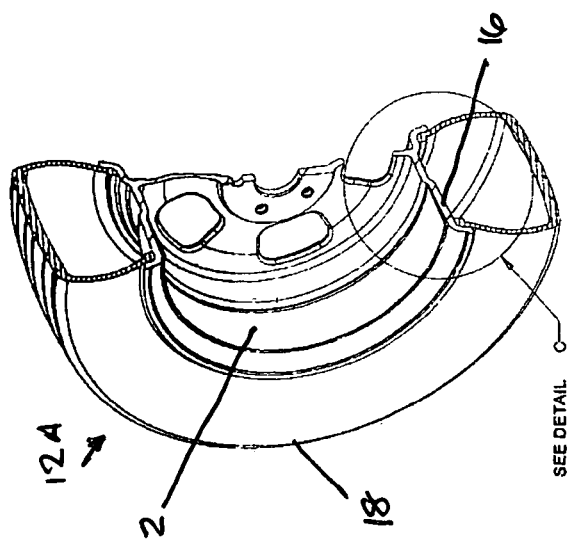
FIGS. 5A, 5B, 5C and 5D are various views of the rim of FIGS. 3 and 4 and a variation of the strip of FIGS. 1A and 1B.
Figure 5D:
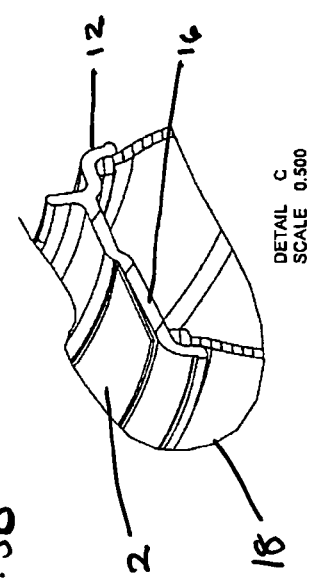
Figure 5B:
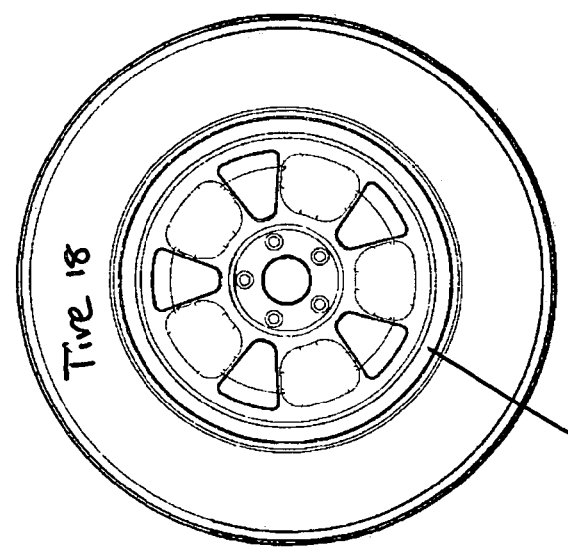
Figure 5A:
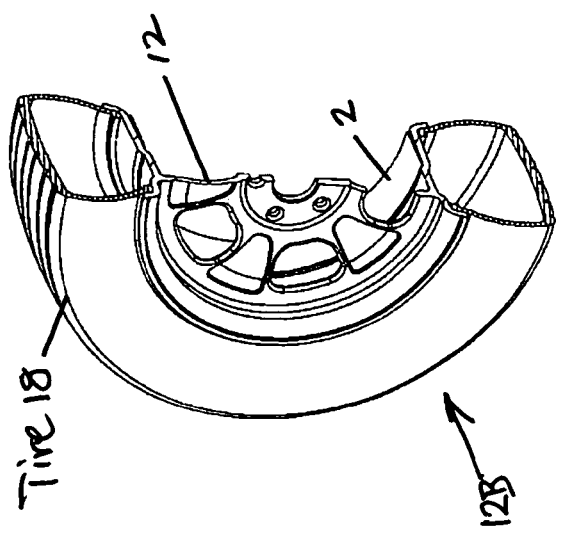

FIG. 5B is a front view of the exterior side 12B of the rim 12 with tire 18 as installed about the outer race 14 of the rim 12. FIG. 5C is a cut-away perspective side view of the interior side 12A of the rim 12, wherein the wherein the strip 2 is shown as adhered to the inner planar race 16. FIG. 5D is a detailed cut-away perspective side view of the interior side 12A of the rim 12, wherein the wherein the strip 2 is shown as removably adhered to the inner planar race 16 by the adhesive 4. The strip 2 of FIG. 5A through FIG. 5D is configured to present a plurality of faces 2C, wherein the faces 2C provide greater surface for the attraction and/or retention of particles P that the flat configuration of the strip 2 as shown in FIG. 1B.

Figure 6:
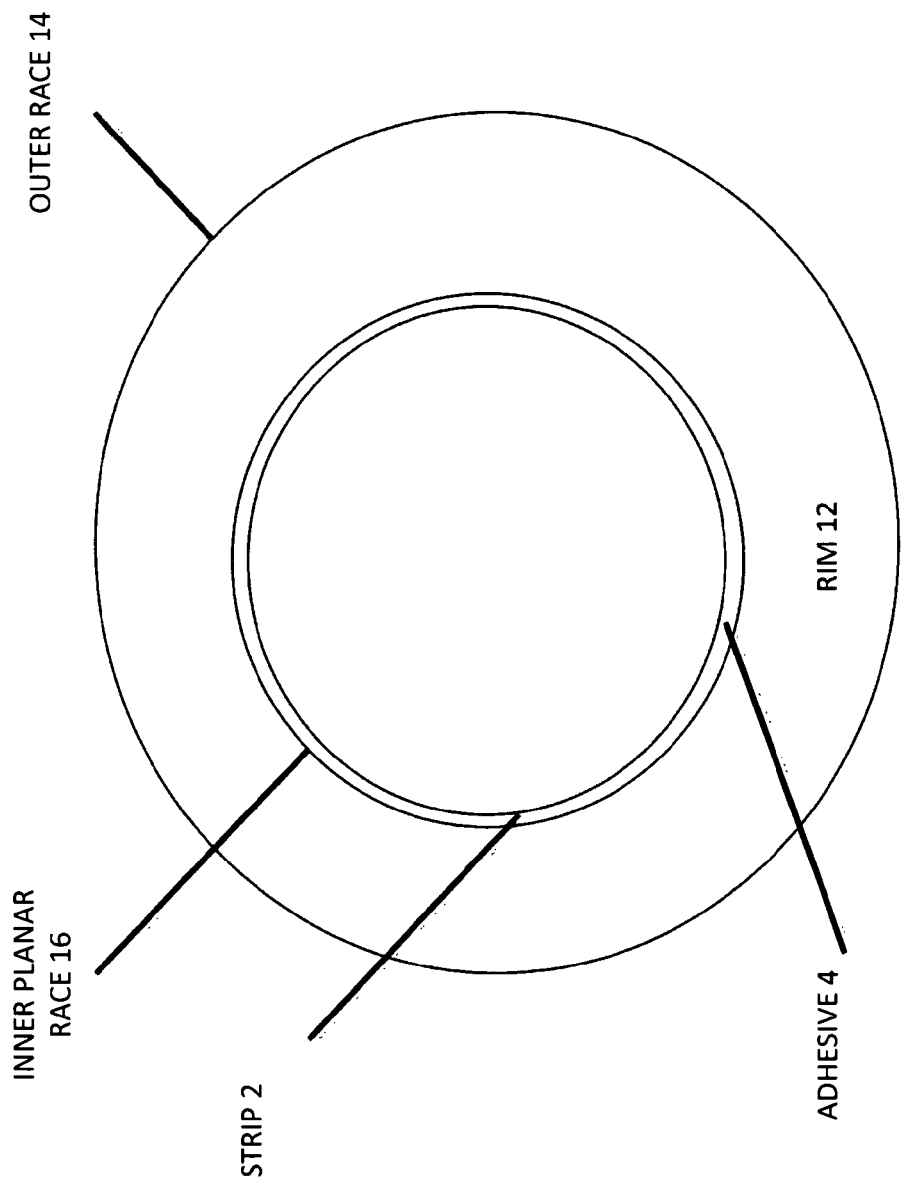
FIG. 6 is a front view of an interior side of the rim of FIGS. 3, 4, and 5A-5D.

Referring now generally to the Figures and particularly to FIG. 6, FIG. 6 is a front view of the interior side 12A of the rim 12. The adhesive 4 detachably couples the strip 2 to the inner planar race 16. The adhesive 4 may be a suitable adhesive known in the art selected to detachably couple the strip to the inner planar race 16, such as WELDWOOD™ industrial contact cement as marketed by U.S. Plywood-Champion Papers, Inc. of New York, N.Y.

Figure 7:
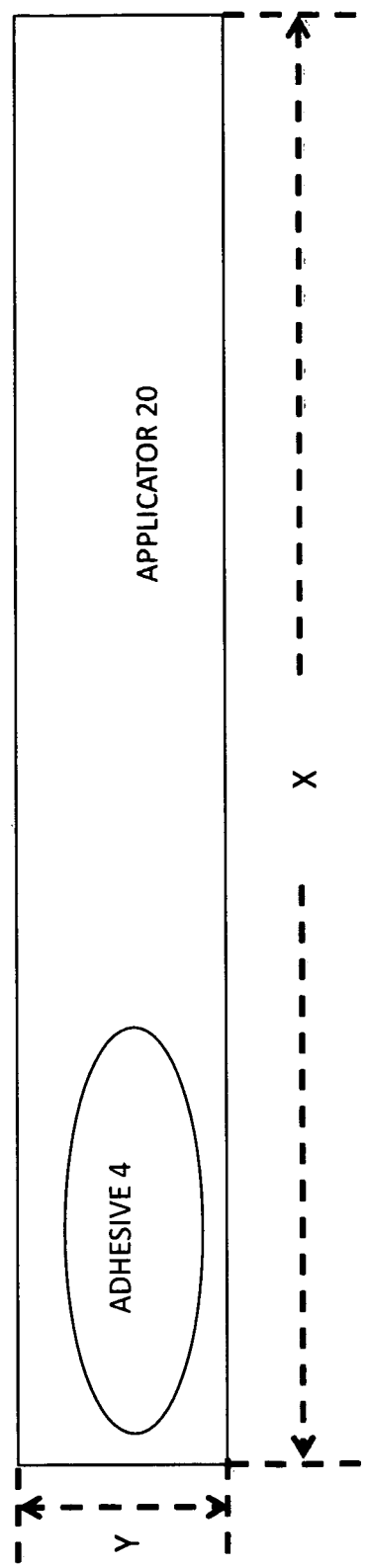
FIG. 7 is a top view of an adhesive applicator having a portion of the adhesive of FIG. 1B.

Referring now generally to the Figures and particularly to FIG. 7, FIG. 7 is a top view of an adhesive applicator 20 having a portion of the adhesive 4. The adhesive applicator 20 is preferably a rigid structure that enables a human operator to deposit the adhesive 4 along the inner planar race 16. The adhesive applicator 20 is further preferably dimensioned at less than three inches along an X-axis and more than six inches along a Y-axis to enable manual application of the adhesive 4.

Figure 8:
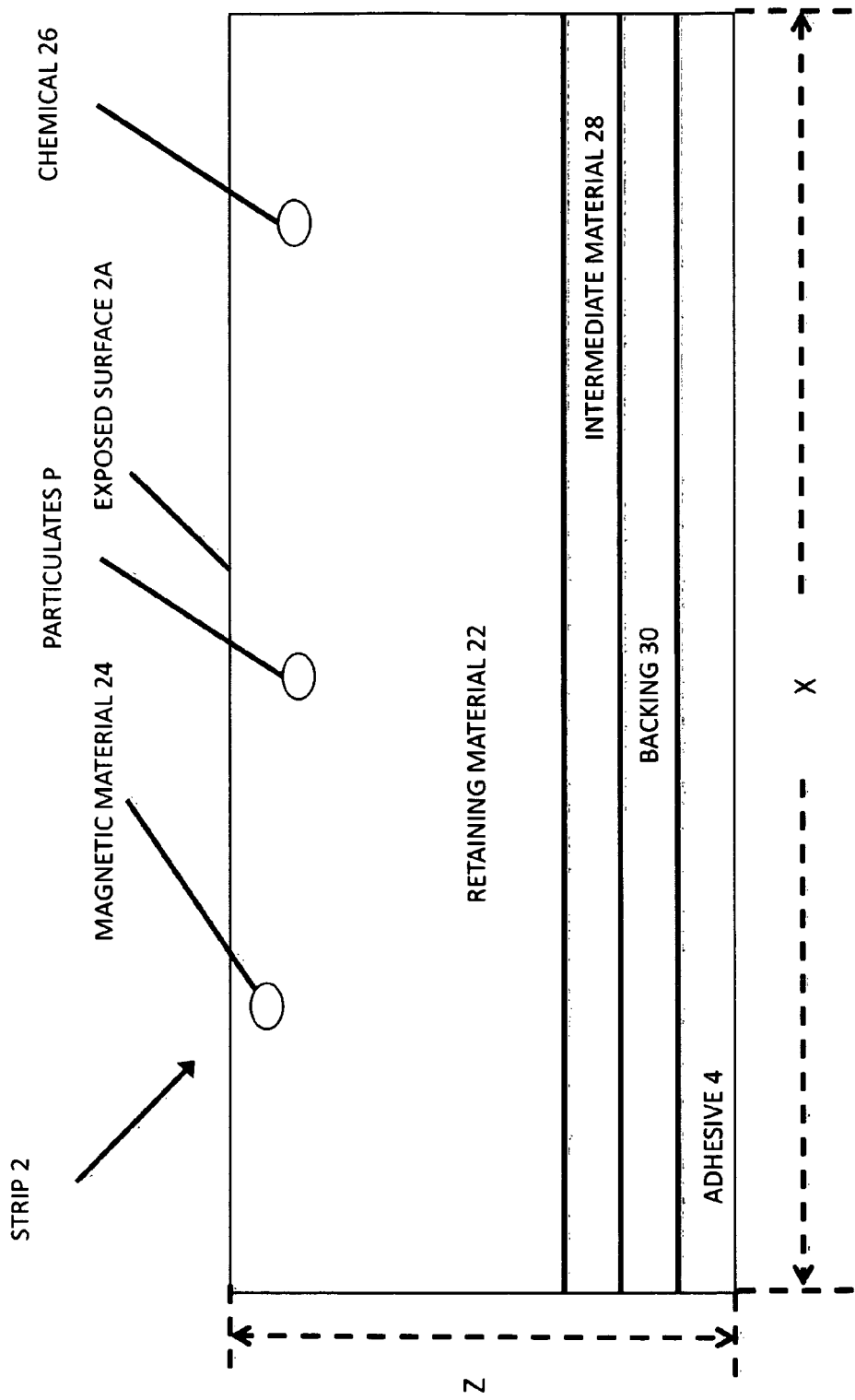
FIG. 8 illustrates a variation of the strip of FIGS. 1A, 1B, 5A, 5B, 5C and 5D, wherein the strip comprises a retaining material.

Referring now generally to the Figures and particularly to FIG. 8, FIG. 8 illustrates a variation of the strip 2, wherein the strip 2 comprises a retaining material 22. The retaining material 22 may be or comprise voids or volumes that support retention of a plurality of the particulates P.

In various configurations of the strip 2, the retaining material 22 may alternatively or additionally be or comprise a suitable natural or synthetic material known in the art that includes cilia that can retain particulates P between or among the cilia therein, such as a strip of ASTROTURF™ synthetic ground covering as marketed by Monsanto Corporation of St. Louis, Mo.

In various alternate configurations of the strip 2, the retaining material 22 may alternatively or additionally be or comprise a material having a nappy structure comprising voids that can retain particulates P, such as a SCOTCH-BRITE™ plastic material as marketed by 3M Corporation of St. Paul, Minn.

The retaining material 22 may alternatively or additionally be or comprise a magnetic material 24, wherein the magnetic material 24 magnetically attracts the particulates P. The magnetic material may be or comprise ferrite powder or other suitable material known in the art. The retaining material 22 may further alternatively or additionally comprise a chemical 26, wherein the chemical 26 attracts the particulates P. For example, the chemical 26 may be or comprise baking soda, or another suitable sodium compound that acts to attract the brake dust.

In various still alternate configurations of the strip 2, the retaining material 22 may alternatively or additionally be or comprise a natural or synthetic fabric containing looped material, such as a Berber carpet strip, wherein the looped material has voids that can retain particulates P.

In various still alternate configurations of the strip 2, an intermediate material 28 couples the retaining to backing 30, wherein the backing 30 is detachably coupled to the inner planar rim 16 by the adhesive 4. The backing 30 may be or comprise nylon or other suitable material known in the art. The intermediate material 28 is selected to couple the backing 30 and the retaining material 22.

Figure 9:
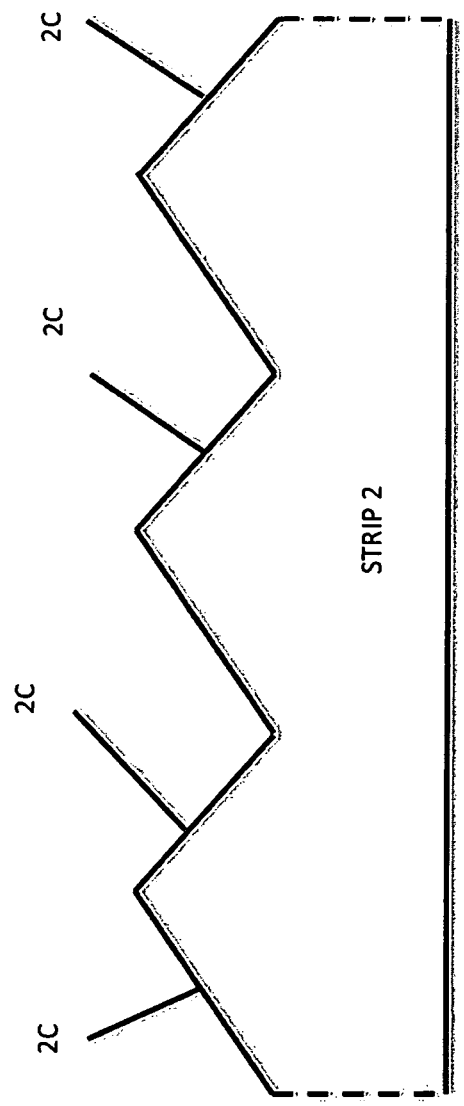
FIG. 9 illustrates another alternate variation of the strip of FIGS. 1A, 1B, 5A, 5B, 5C and 5D, wherein the exposed surface of the strip is formed with a plurality of faces.

Referring now generally to the Figures and particularly to FIG. 9, FIG. 9 illustrates another alternate variation of the strip 2, wherein the exposed surface 2A of the strip 2 is formed with a plurality of faces 2C that extend from the plane defined by the X-axis and the Y-axis. The extensions of the faces 2C provide a greater surface area to capture and retain particulates P than the flatter exposed surface 2A of FIG. 2.

Figure 10:
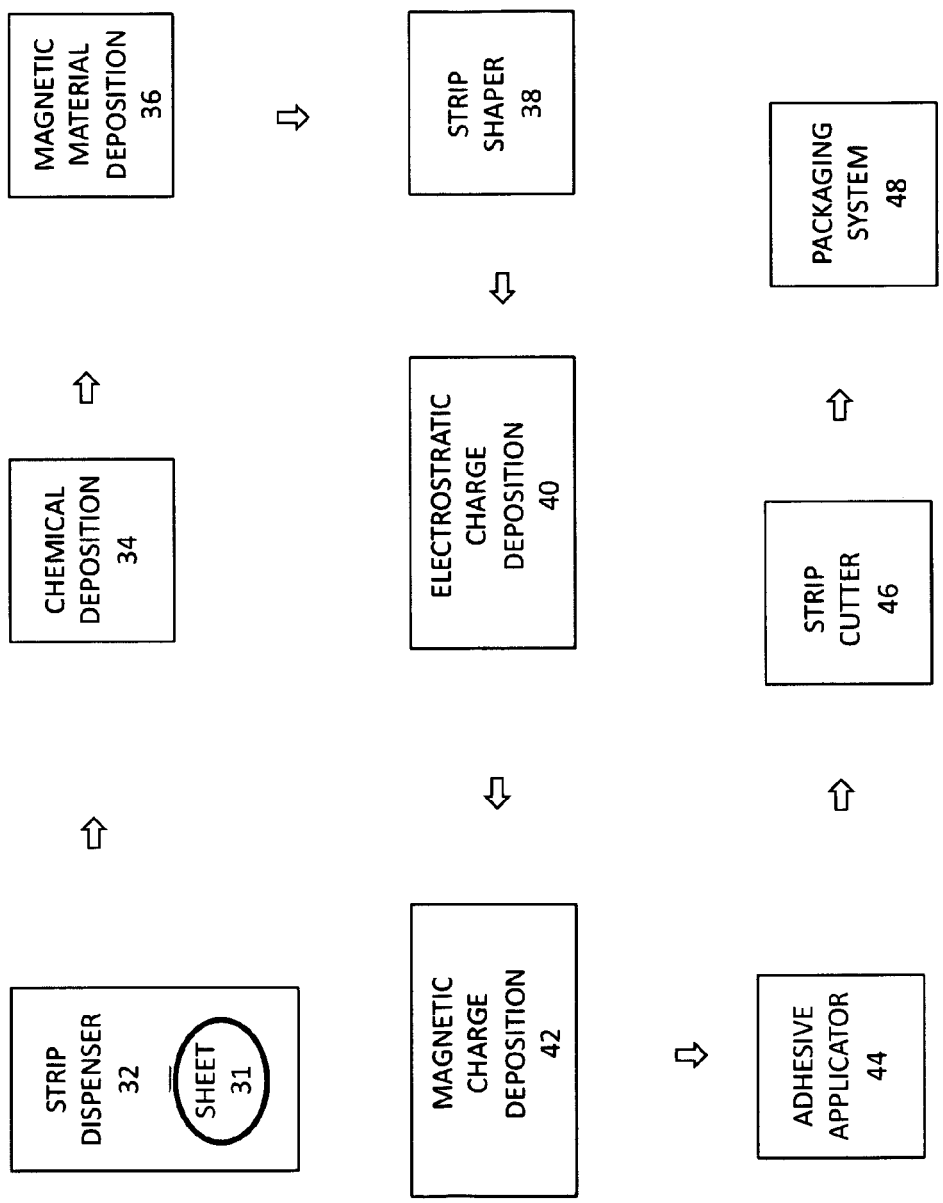
FIG. 10 is a schematic diagram of a series of equipments that are used to prepare and modify the strip.

Referring now generally to the Figures and particularly to FIG. 10, FIG. 10 is a schematic diagram of a series of equipments 34 through 48 that are used to prepare and modify the strip 2 in accordance with various aspects of the method of the present invention. A strip dispenser 32 rolls-out a sheet of material comprising a plurality of conjoined strips 2 for processing by one or more other systems 34 through 48. A chemical deposition system 34 introduces the chemical 26 upon and/or into the retaining material 22. A magnetic deposition system 36 introduces the magnetic material 24 upon and/or into the retaining material 22. A strip shaping system 38 forms the faces 2C onto the exposed surface 2A of the strip 2. An electrostatic charge deposition system 40 causes, or imposes, an electrostatic charge, on the strip 2. A magnetic charge deposition system 42 imposes magnetic charge on the strip 2. An adhesive applicator 44 places the adhesive 4 on the back surface 2B of the strip 2. A strip cutter 46 individuates each of a plurality of strips 2 from the sheet of material 31. A packaging system 48 packages each strip 2 for shipment.

Figure 11:
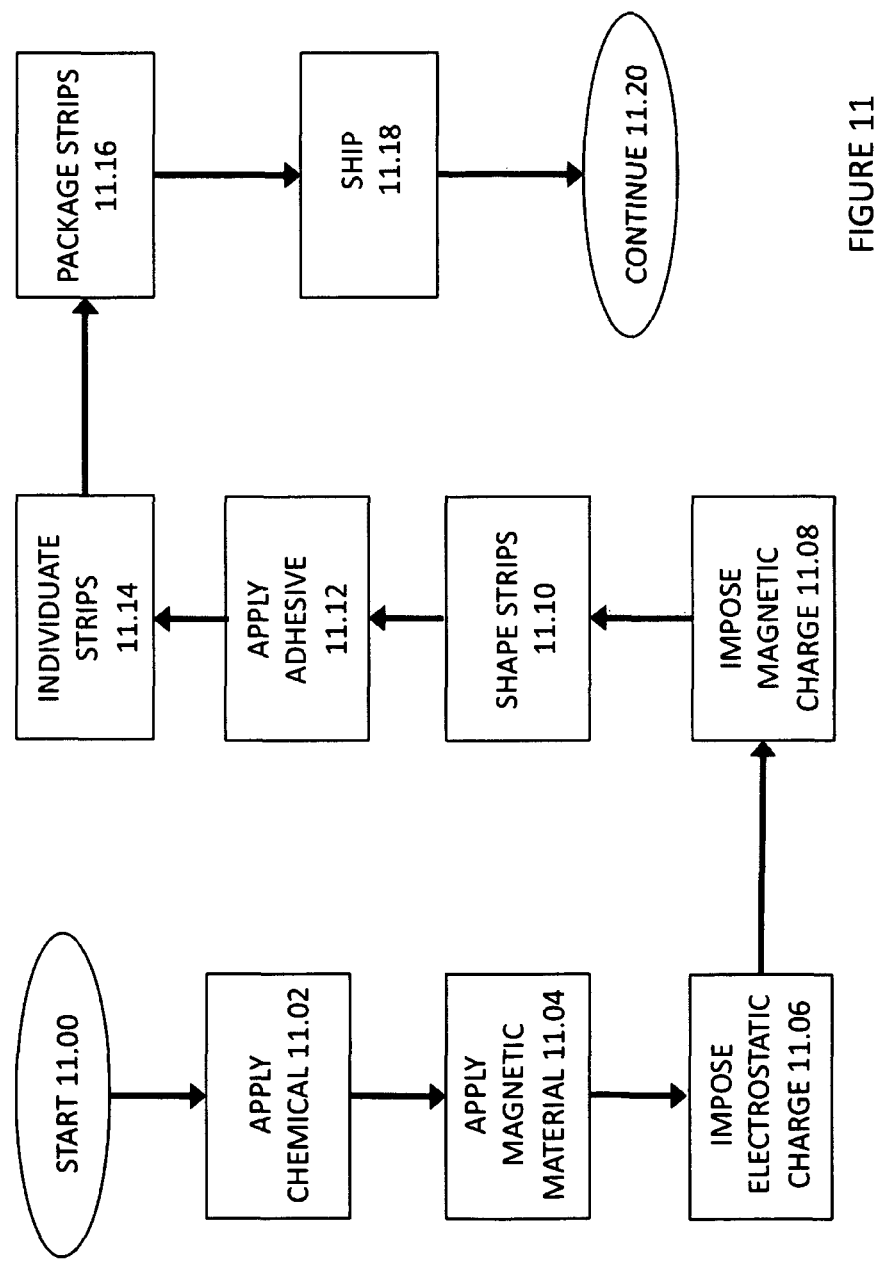
FIG. 11 is a process diagram of a method of preparing and modifying a plurality of the strips of FIGS. 1A, 1B, 5A, 5B, 5C and 5D.

Referring now generally to the Figures and particularly to FIG. 11, FIG. 11 is a process diagram of a method of preparing and modifying a plurality of the strips 2 in accordance with various aspects of the method of the present invention. In step 11.02 the chemical 26 is deposited onto and/or into the sheet 31. In step 11.04 the magnetic material 24 is deposited onto and/or into the sheet 31. In step 11.06 an electrostatic charge is imposed upon, or otherwise caused to instantiate, on the sheet 31. The exposed surface 2A of the strips 2 may be modified in step 11.10. The adhesive 4 is applied to the back surfaces 2B of the sheet 31 in step 11.12. In step 11.14 the sheet 31 is cut to form each of a plurality of strips 2. Each strip is packaged for shipment in step 11.16 and the packaged strips are shipped in step 11.18.

Figure 12:
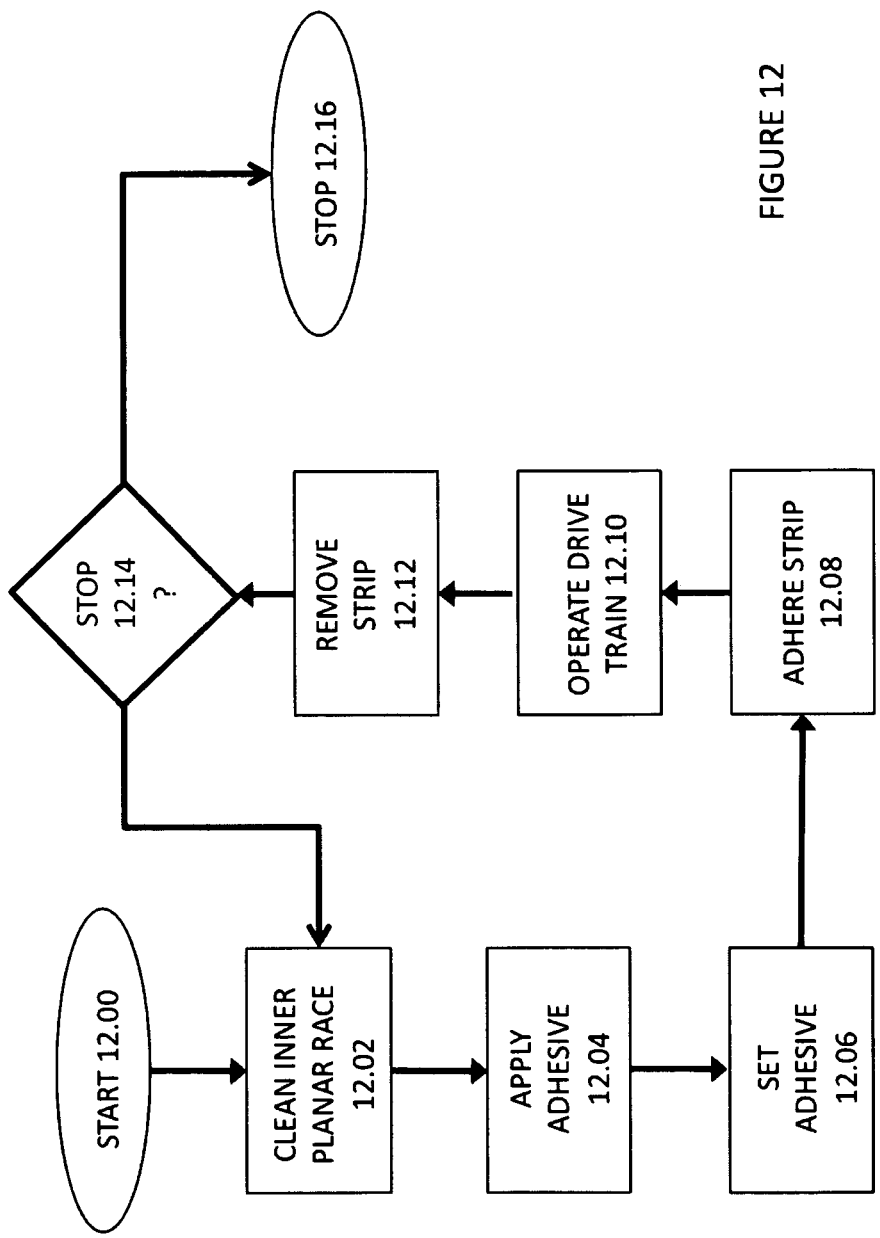
FIG. 12 is a process diagram of a method of applying one or more strips of FIGS. 1A, 1B, 5A, 5B, 5C and 5D.

Referring now generally to the Figures and particularly to FIG. 12, FIG. 12 is a process diagram of a method of applying one or more strips 2 in accordance with various aspects of the method of the present invention. In step 12.02 the inner planar race 16 is cleaned, possibly of earlier applied adhesive 4. Adhesive is freshly applied in step 12.04 and the adhesive 4 applied in step 12.04 is allowed to set in step 12.06. The applicator 20 may be used to manually apply the adhesive 4 in step 12.04. A strip 2 is unpackaged and pressed against the inner planar race 16 in step 12.08. The vehicle comprising the rim 12 is then repeatedly operated in step 12.10, wherein the one or more brake shoes 6 and 10 are repeatedly compressed against the axle 8 and/or the rim 12 to cause a deceleration of the wheel 18. Particles P are repeatedly generated during the applications of the brake shoes 6 and 10 of step 12.10. The strip 2 is then removed in step 12.12. A human operator decides in step 12.14 whether to repeat the cycle of steps 12.02 through 12.14.

The foregoing disclosures and statements are illustrative only of the present invention, and are not intended to limit or define the scope of the present invention. The above description is intended to be illustrative, and not restrictive. Although the examples given include much specificity, they are intended as illustrative of only certain possible applications of the present invention. The examples given should only be interpreted as illustrations of some of the applications of the present invention, and the full scope of the Present Invention should be determined by the appended claims and their legal equivalents. Those skilled in the art will appreciate that various adaptations and modifications of the just-described applications can be configured without departing from the scope and spirit of the present invention. Therefore, it is to be understood that the present invention may be practiced other than as specifically described herein. The scope of the present invention as disclosed and claimed should, therefore, be determined with reference to the knowledge of one skilled in the art and in light of the disclosures presented above.

The invention claimed is:

1. A device comprising:
   a strip of material, the strip sized and shaped to at least partially cover an inner planar race of a wheel rim, the strip of material substantially adhering to the wheel rim, the strip of material selected to retain airborne particulates; and
   an adhesive disposed between the strip of material and the inner race of the wheel rim, the adhesive for detachably coupling the strip of material to the inner planar race.

2. The device of claim 1, wherein the strip of material has an electrostatic charge.

3. The device of claim 1, wherein the strip of material has a magnetic charge.

4. The device of claim 1, wherein the strip of material comprises a magnetized material.

5. The device of claim 1, wherein the strip of material comprises a chemical material that exhibits an attractive force that pulls the airborne particulates.

6. The device of claim 1, wherein the strip of material presents an exposed ridged surface away from the inner planar race of the wheel.

7. The device of claim 1, wherein the strip of material comprises napped material.

8. The device of claim 1, wherein the strip of material comprises a plurality of cilia extending away from the inner planar race of the wheel.

9. The device of claim 1, wherein the strip of material comprises looped material.

10. The device of claim 1, wherein the strip is sized and shaped to cover at least 50% of a surface area of the inner planar race.

11. The device of claim 1, wherein the strip is sized and shaped to cover at least 90% of a surface area of the inner planar race.

12. The device of claim 1, wherein the strip is sized and shaped to cover at least 100% of a surface area of the inner planar race.

* * * * *